(12) United States Patent
Lee

(10) Patent No.: US 8,594,214 B2
(45) Date of Patent: Nov. 26, 2013

(54) INPUT MODULE OF PLC

(75) Inventor: Sang Back Lee, Cheonan (KR)

(73) Assignee: LSIS Co., Ltd., Anyang-si, Gyeonggi-Do (KR)

( * ) Notice: Subject to any disclaimer, the term of this patent is extended or adjusted under 35 U.S.C. 154(b) by 324 days.

(21) Appl. No.: 13/079,728

(22) Filed: Apr. 4, 2011

(65) Prior Publication Data

US 2011/0249717 A1  Oct. 13, 2011

(30) Foreign Application Priority Data

Apr. 9, 2010  (KR) ......................... 10-2010-0032916

(51) Int. Cl.
  *H04K 1/10* (2006.01)
(52) U.S. Cl.
  USPC ........... 375/260; 375/299; 375/267; 375/349; 375/360; 375/373
(58) Field of Classification Search
  USPC ......... 375/260, 360, 371, 373, 377, 299, 267, 375/349
  See application file for complete search history.

(56) References Cited

U.S. PATENT DOCUMENTS

| | | | |
|---|---|---|---|
| 4,982,350 A * | 1/1991 | Perna et al. | 702/89 |
| 5,452,333 A * | 9/1995 | Guo et al. | 375/371 |
| 6,226,230 B1 * | 5/2001 | Watanabe | 368/113 |

FOREIGN PATENT DOCUMENTS

| | | |
|---|---|---|
| CN | 1172538 | 2/1998 |
| JP | 06-223293 | 8/1994 |
| JP | 2000-266566 | 9/2000 |
| JP | 2001-249708 | 9/2001 |
| JP | 2001249708 | 9/2001 |
| KR | 10-0188670 | 6/1999 |

OTHER PUBLICATIONS

The State Intellectual Property Office of the People's Republic of China Application Serial No. 201110092361.X, Office Action dated Dec. 25, 2012, 5 pages.

* cited by examiner

*Primary Examiner* — Kabir A Timory
(74) *Attorney, Agent, or Firm* — Lee, Hong, Degerman, Kang & Waimey

(57) ABSTRACT

Disclosed is an input module of a programmable logic controller (PLC) capable of counting coefficient values of multiple channels. An input module of a PLC includes a plurality of detection units, a decision unit and a control unit. The plurality of detection units receives a pulse signal corresponding to each channel, applied from a load having a plurality of channels, detects rising and falling edges of the pulse signal, and transmits an output signal that is the detected result. The decision unit receives a plurality of output signals respectively transmitted from the plurality of detection units, detects edges of the plurality of channels, and transmits a detection signal that is the detected result. The control unit identifies the presence of occurrence of an interrupt using the detection signal transmitted from the decision unit and performs a counting process using the applied pulse signal when the interrupt occurs.

11 Claims, 4 Drawing Sheets

INPUT MODULE OF PLC

CROSS-REFERENCE TO RELATED APPLICATION

Pursuant to 35 U.S.C. 119(a), this application claims the benefit of earlier filing date and right of priority to Korean Application No. 10-2010-0032916, filed on Apr. 9, 2010, the contents of which is incorporated by reference herein in its entirety.

BACKGROUND OF THE INVENTION

1. Field of the Invention

An aspect of the present invention relates to an input module of a PLC, and more specifically, to an input module of a PLC, which receives a signal inputted from a sensor or switch.

2. Description of the Related Art

A programmable logic controller (PLC) applied to various fields such as automation of factory facilities in industries includes a central processing unit (CPU) module including a CPU, an input module that receives a signal inputted from a sensor or switch, a high-speed counter module that receives a signal inputted from an encoder, an output module that transfers a control signal to a motor or valve as a control object, a communication module, a proportional integral differential (PID) control module, a positioning module, and the like.

The high-speed module is a module that receives a signal inputted from a high-speed encoder so as to perform calculation using a microprocessor.

However, since the number of timer pulse units or interrupt modules of the microprocessor is limited, the high-speed counter module has a problem that it is difficult to configure multiple channels.

The high-speed counter module also has a problem that a separate module for processing a counter function is required to increase the number of channels.

In order to solve such problems, it is intended to perform the counter function using the input module, but the input module is implemented in such a manner to simply periodically read values. Hence, it is impossible to detect a rising or falling edge of a pulse.

Further, there is a limitation in increasing the number of channels.

SUMMARY OF THE INVENTION

Embodiments of the present invention provide an input module of a PLC, which can count coefficient values of multiple channels by using an additional circuit that detects an edge of a pulse.

According to an aspect of the present invention, there is provided an input module of a PLC, including: a plurality of detection units configured to receive a pulse signal corresponding to each channel, applied from a load having a plurality of channels, detect rising and falling edges of the pulse signal, and transmit an output signal that is the detected result; a decision unit configured to receive a plurality of output signals respectively transmitted from the plurality of detection units, detect edges of the plurality of channels, and transmit a detection signal that is the detected result; and a control unit configured to identify the presence of occurrence of an interrupt using the detection signal transmitted from the decision unit and perform a counting process using the applied pulse signal when the interrupt occurs.

Each of the plurality of detection units may include a first edge detector configured to receive the applied pulse signal as a clock signal and detect a rising edge by outputting a low signal when the rising edge is generated in the pulse signal.

Each of the plurality of detection units may include an inverter configured to invert the pulse signal; and a second edge detector configured to receive the inverted pulse signal as a clock signal and detect a falling edge by outputting a low signal when the rising edge is generated in the pulse signal.

Each of the first and second edge detectors may be configured as a flip-flop that outputs a low signal when the rising edge is generated in the pulse signal and outputs a high signal when the falling edge is generated in the pulse signal.

The decision unit may detect edges respectively corresponding to the plurality of channels by outputting a high signal when at least one of the plurality of output signals is a low signal.

When the interrupt occurs, the control unit may perform a counting process of increasing or decreasing a coefficient value by detecting in which channel an edge is generated and which kind of edge is generated, using the pulse signal transmitted from the load.

When a rising or falling edge is generated in any one of the plurality of channels, the control unit may increase or decrease the coefficient value by detecting whether the pulse signal of another channel is high or low.

The decision unit may be configured as a NAND gate that receives the plurality of output signals and outputs a high signal when at least one of the plurality of output signals is a low signal.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

The present invention is described more fully hereinafter with reference to the accompanying drawings, in which embodiments of the present invention are shown. This present invention may, however, be embodied in many different forms and should not be construed as limited to the embodiments set forth herein. Rather, these embodiments are provided so that this disclosure is thorough, and will fully convey the scope of the present invention to those skilled in the art.

Figure 1:
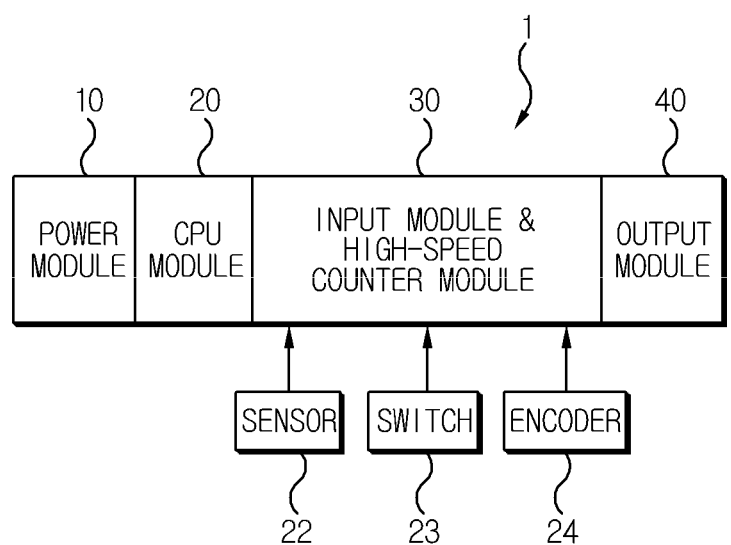
FIG. 1 is a block diagram showing a configuration of a PLC system according to an embodiment of the present invention.

FIG. 1 is a block diagram showing a configuration of a PLC system according to an embodiment of the present invention.

Referring to FIG. 1, the PLC system 1 includes a power module 10 that supplies power to the entire PLC system; a CPU module 20 that performs general control operations of the entire PLC system and transmits/receives data to/from a high-order system through communications; a input module 30 with a built-in function of a counter module that receives data inputted from a sensor 22 or switch 23 so as to transfer the data to the CPU module and receives a pulse signal inputted from an encoder 24 so as to count a coefficient value; and an output module 40 that receives a control command transferred from the CPU module 20 so as to output an operation signal to a load that is a control object.

Figure 2:
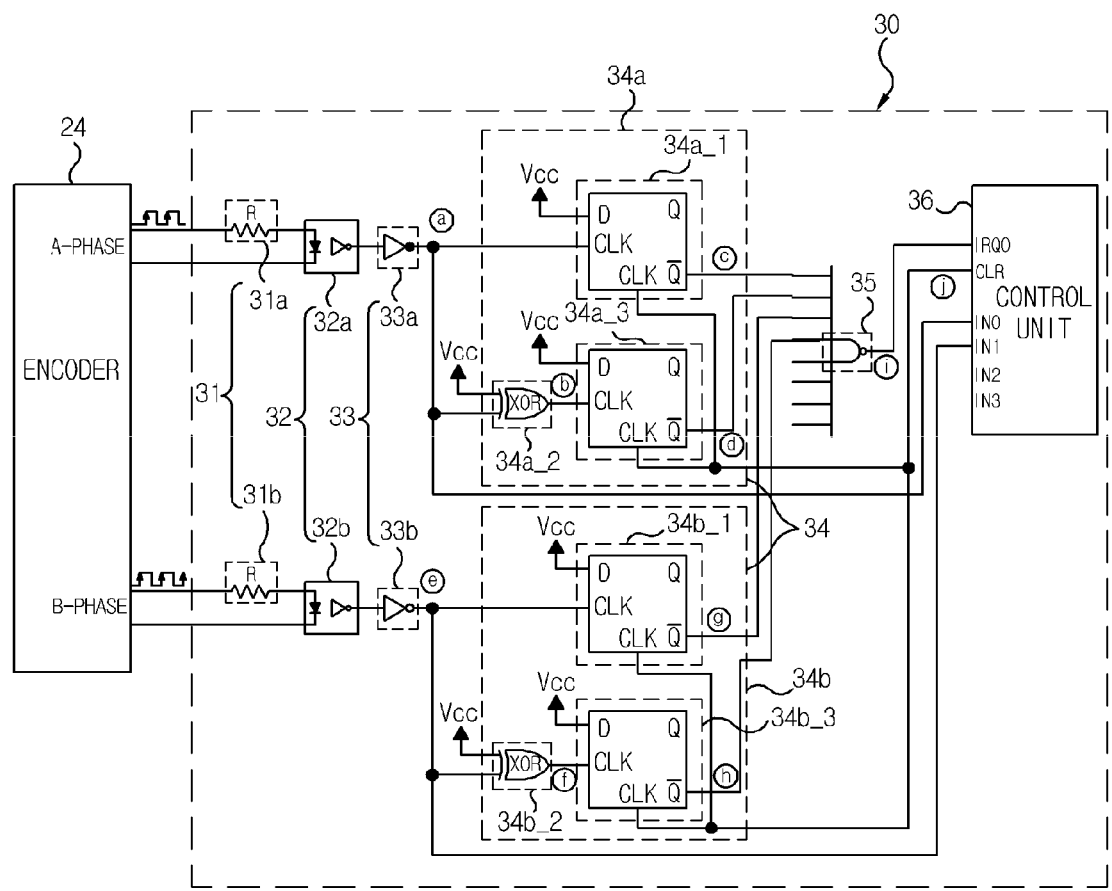
FIG. 2 is a circuit diagram showing a configuration of an input module including an edge detection circuit according to the embodiment of the present invention.
Figure 3:
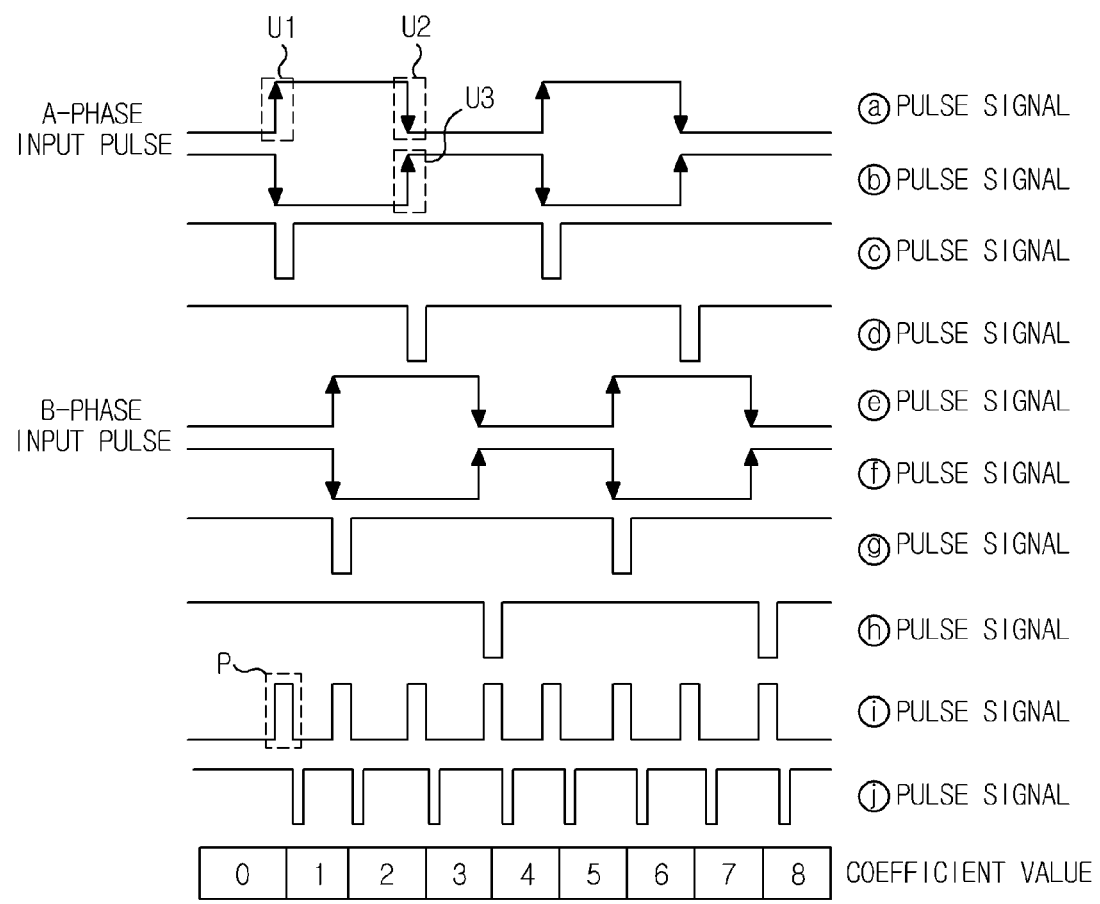
FIG. 3 is a view showing a state that the input module is operated according to the embodiment of the present invention.

FIG. 2 is a circuit diagram showing a configuration of an input module including an edge detection circuit according to the embodiment of the present invention. FIG. 3 is a view showing a state that the input module is operated according to the embodiment of the present invention.

As shown in FIGS. 2 and 3, the input module 30 of a PLC includes an adjustment unit 31 (31a and 31b), an insulation unit 32 (32a and 32b), a stabilization unit 33 (33a and 33b), a detection unit 34 (34a (34a_1, 34a_2 and 34a_3) and 34b (34b_1, 34b_2 and 34b_3)), a decision unit 35 and a control unit 36.

Before describing the input module 30 of the PLC, in this embodiment, channels are divided into two, i.e., an A-phase and a B-phase. However, the number of channels is not limited thereto but may be varied.

Hereinafter, components of the input module of the PLC according to this embodiment will be described in detail.

The load having a plurality of channels, i.e., the encoder 24 outputs the displacement, speed and the like of a motor in a pulse type to each of the channels. The adjustment unit 31 (31a and 31b) is configured as a resistor or the like so as to adjust an input voltage to a voltage level suitable for operation of the insulation unit 32 (32a and 32b).

The insulation unit 32 (32a and 32b) transfers a pulse-type signal (AC voltage) output from the encoder 24 to the stabilization unit 33 (33a and 33b), and performs insulation of internal and external circuits.

The stabilization unit 33 (33a and 33b) stabilizes the pulse-type signal, i.e., the pulse signal transferred from the insulation unit 32 (32a and 32b) and transfers the stabilized pulse signal to the detection unit 34 (34a and 34b).

The detection unit 34 (34a and 34b) is a unit that detects rising and falling edges of the pulse signal and transfers an output signal that is a detected result to the decision unit 35. One detector is provided for each of the channels. For example, in a case where the encoder 24 has two channels, one adjustment unit 31, one insulation unit 32, one stabilization unit 33 and one detection unit 34 are provided for each of the channels.

The detection units 34a and 34b are provided with first edge detectors 34a_1 and 34b_1, inverters 34a_2 and 34b_2, and second edge detectors 34a_3 and 34b_3, respectively.

The first edge detector 34a_1 or 34b_1 is a unit that detects a rising edge, and outputs a first output signal by receiving a pulse signal transferred from the stabilization unit 33a or 33b as a clock signal and receiving a power voltage Vcc as an input signal.

This will be more specifically described with reference to FIG. 3. In the first edge detector 34a_1 or 34b_1, the power voltage Vcc is applied to an input terminal D, and the pulse signal of Ⓐ is applied to a clock terminal CLK. If a rising edge (portion U1 in FIG. 3) is generated in the pulse signal, the first edge detector 34a_1 or 34b_1 outputs a low signal (output signal of Ⓒ) and detects a portion at which the rising edge is generated.

In this instance, the rising edge is a time when the pulse signal is changed from low (0) to high (1), and refers to the portion U1 in FIG. 3. The falling edge is a time when the pulse signal is changed from high (1) to low (0), and refers to portion U2 in FIG. 3.

The first edge detector 34a_1 or 34b_1 is configured as a D flip-flop.

The inverter 34a_2 or 34b_2 is configured as an exclusive OR (XOR) gate so as to invert the pulse signal of Ⓐ transferred from the stabilization unit 33a or 33b.

The inverter 34a_2 or 34b_2 inverts the pulse signal so as to detect a portion at which the rising edge is generated. That is, if a rising edge is detected in the pulse signal of Ⓑ as shown in FIG. 3, the falling edge of the pulse signal of Ⓐ can be detected because the pulse signal of Ⓑ is obtained by inverting the pulse signal of Ⓐ.

The second edge detector 34a_3 or 34b_3 receives the inverted pulse signal as a clock signal. If a rising edge is generated in the pulse signal, the second edge detector 34a_3 or 34b_3 outputs a low signal and detects a falling edge.

More specifically, in the second edge detector 34a_3 or 34b_3, the power voltage Vcc is applied to an input terminal, and the pulse signal of Ⓑ is applied to a clock terminal CLK. If a rising edge (portion U3) is generated in the pulse signal of Ⓑ, the second edge detector 34a_3 or 34b_3 outputs the low signal of Ⓓ. Since the pulse signal of Ⓑ is obtained by inverting the pulse signal of Ⓐ, the rising edge portion (portion U3) of the pulse signal of Ⓑ becomes the falling edge portion (portion U2) of the pulse signal of Ⓐ, and thus it is possible to detect the falling edge of the pulse signal of Ⓐ.

The decision unit 35 is configured as a NAND gate. The decision unit 35 receives a plurality of output signals transmitted from the detection unit and detects edges of a plurality of channels, thereby transmitting a detection signal that is a detected result to the control unit 36.

More specifically, in FIG. 2, the decision unit 35 receives two signals respectively outputted from the first and second edge detectors 34a_1 and 34a_3 of the A-phase, and two signals respectively outputted from the first and second edge detectors 34b_1 and 34b_3 of the B-phase, and decides whether or not a low signal is received from at least one of the edge detectors.

If the low signal is received, the decision unit 35 outputs a high signal, thereby detecting an edge of the A-phase or B-phase.

The control unit 36 is a microcomputer that generally controls the input module 30, and identifies the presence of occurrence of an interrupt using the detection signal transmitted from the decision unit 35. If the interrupt occurs, the control unit 36 performs counting by using the pulse signal outputted from the encoder 24.

More specifically, if a high signal is outputted from the decision unit 35 (i.e., if an edge is generated in any one of the plurality of channels), the control unit 36 decides that an interrupt occurs. If it is decided by the control unit 36 that the interrupt occurs, the control unit 36 receives the pulse signal outputted from the encoder 24 so as to detect in which channel an edge is generated and which kind of edge is generated, thereby increasing or decreasing a coefficient value.

That is, in FIG. 3, the pulse signal of Ⓘ is a detection signal outputted from the decision unit 35. According to a pulse (portion P) at which a high signal is first generated in the pulse signal of Ⓘ, it can be seen that the rising edge (portion U1) is generated in the pulse signal of Ⓐ. If the rising edge is generated in the pulse signal of Ⓐ and the pulse signal of Ⓐ is low, the control unit 36 increases the coefficient value by 1.

On the contrary, if the rising edge is generated in the pulse signal of Ⓐ and the pulse signal of Ⓔ is high, the control unit 36 decreases the coefficient value by 1.

If the falling edge is generated in the pulse signal of (a) and the pulse signal of (e) is low, the control unit 36 decreases the coefficient value by 1. If the falling edge is generated in the pulse signal of (a) and the pulse signal of (e) is high, the control unit 36 increases the coefficient value by 1.

A process of counting coefficient values after the occurrence of an interrupt according the embodiment of the present invention will be described below.

Figure 4:
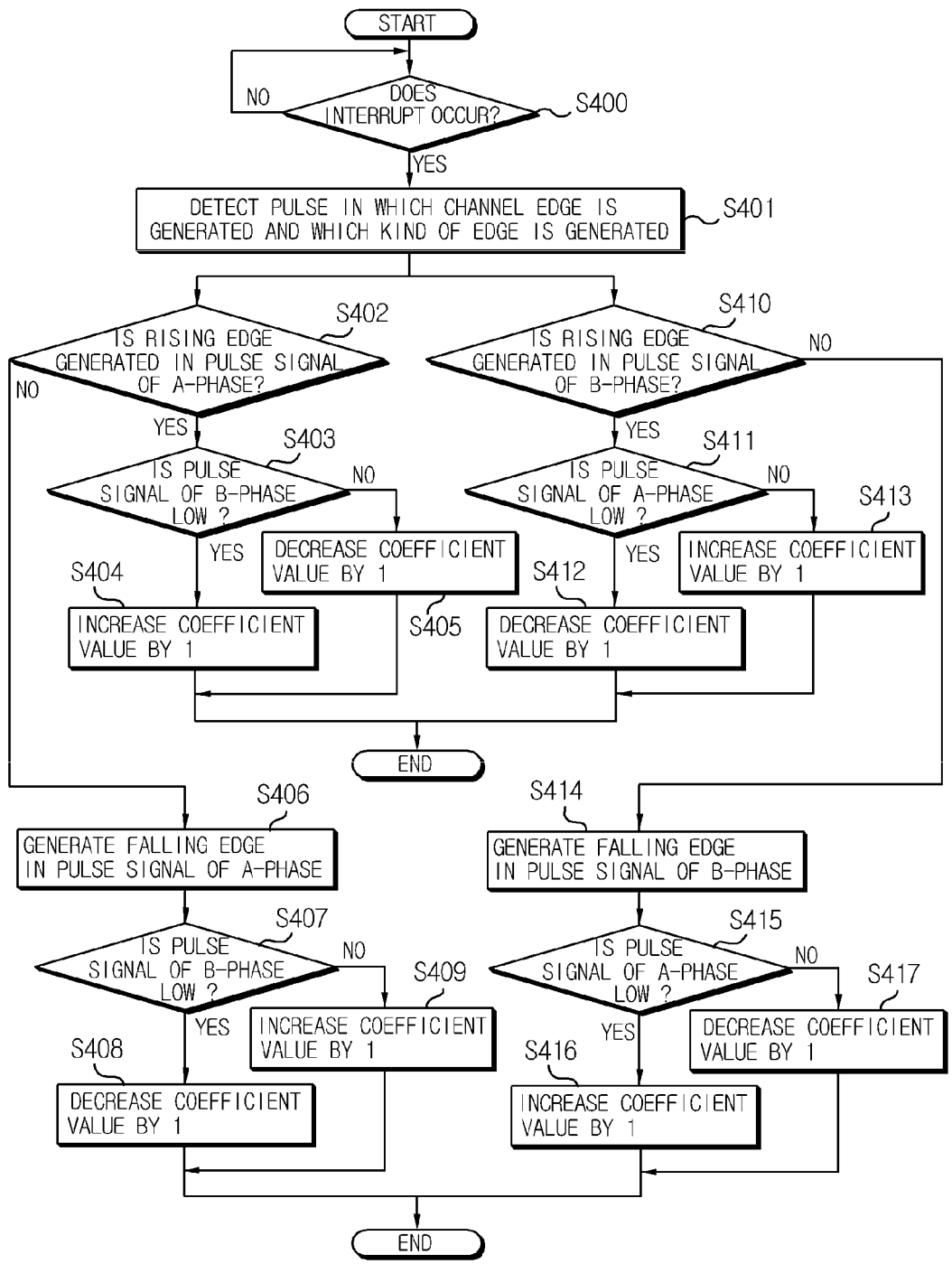
FIG. 4 is an operation flowchart illustrating a process of counting coefficient values of A and B phases according to the embodiment of the present invention.

FIG. 4 is an operation flowchart illustrating a process of counting coefficient values of A- and B-phases according to the embodiment of the present invention.

Referring to FIG. 4, the control unit 36 decides whether or not an interrupt occurs (S400).

If the interrupt occurs in the operation S400, the control unit 36 analyzes a pulse signal applied to terminals IN0 to IN3 of the control unit 36 and detects in which channel (A-phase or B-phase) an edge is generated and which kind of edge (rising edge or falling edge) is generated (S401).

Next, if it is decided that the rising edge is generated in the A-phase ('Yes' in operation S402), the control unit 36 detects whether the pulse signal of the B-phase is in a low state or high state (i.e., whether the pulse signal is a low signal or high signal) (S403).

If the pulse signal of the B-phase is low ('Yes' in the operation 403), the control unit 36 increases a coefficient value by 1 (S404). If the pulse signal of the B-phase is high ('No' in the operation 403), the control unit 36 decreases the coefficient value by 1 (S404).

Meanwhile, if it is decided in the operation S402 that the rising edge is not generated in the A-phase but the falling edge is generated in the A-phase (S406), the control unit 36 detects whether the pulse signal of the B-phase is lower or high (S407).

If the pulse signal of the B-phase is low ('Yes' in the operation S407), the control unit 36 decreases the coefficient value by 1 (S408). If the pulse signal of the B-phase is high ('No' in the operation S407), the control unit 36 increases the coefficient value by 1 (S409).

Meanwhile, if it is decided that the rising edge is generated in the B-phase ('Yes' in operation S410), the control unit 36 detects whether the pulse signal of the A-phase is in a low state or high state (i.e., whether the pulse signal is a low signal or high signal) (S411).

If the pulse signal of the A-phase is low ('Yes' in the operation S411), the control unit 36 decreases the coefficient value by 1 (S412). If the pulse signal of the A-phase is high ('No' in the operation S411), the control unit 36 increases the coefficient value by 1 (S413).

Meanwhile, if it is decided that the rising edge is not generated in the B-phase but the falling edge is generated in the B-phase (S414), the control unit 36 detects whether the pulse signal of the A-phase is low or high (S415).

If the pulse signal of the A-phase is low ('Yes' in the operation S16), the control unit 36 increases the coefficient value by 1 (S416). If the pulse signal of the A-phase is high ('No' in the operation S415), the control unit 36 decreases the coefficient value by 1 (S417).

The control unit 36 outputs a low signal to a CLR terminal of the decision unit 35 so as to clear the output signal of the decision unit 35, thereby ending the interrupt.

As described above, in an input module of a PLC according to embodiments of the present invention, rising and falling edges are easily detected by adding a circuit that detects an edge of a pulse to the input module of the PLC, so that it is possible to perform counting even though the number of channels is increased.

Also, it is possible to effectively vary the number of channels without an increase of the resources of a microprocessor, caused by an increase in the number of channels.

Also, by applying a digital input circuit, it is possible to more easily perform the function of a multi-channel and high-speed counter without a built-in microprocessor as compared with a conventional counter module.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An input module of a programmable logic controller (PLC), the input module comprising:
   a plurality of detection units each configured to:
      receive a pulse signal via a channel, the pulse signal applied from a load having a plurality of channels;
      detect rising and falling edges of the pulse signal; and
      transmit an output signal that is a result of detecting rising and falling edges of the pulse signal;
   a decision unit configured to:
      receive a plurality of output signals each transmitted from one of the plurality of detection units,
      detect edges of each of the plurality of channels; and
      transmit a detection signal that is a result of detecting edges of each of the plurality of channels; and
   a control unit configured to identify the occurrence of an interrupt using the detection signal transmitted from the decision unit and perform a counting process using the pulse signal when the interrupt occurs,
   wherein each of the plurality of detection units comprises:
      a first edge detector configured to receive the pulse signal as a clock signal and output a low signal when the rising edge is detected in the pulse signal;
      an inverter configured to invert the pulse signal; and
      a second edge detector configured to receive the inverted pulse signal as a clock signal and output a low signal when the rising edge is detected in the pulse signal.

2. The input module of claim 1, wherein each of the first and second edge detectors is configured as a flip-flop that outputs a low signal when the rising edge is detected in the pulse signal and outputs a high signal when the falling edge is detected in the pulse signal.

3. The input module of claim 1, wherein the decision unit is further configured to output a high signal when at least one of the plurality of output signals is a low signal.

4. The input module of claim 1, wherein, the control unit is further configured to use the received pulse signal to perform a counting process of increasing or decreasing a coefficient value when the interrupt occurs by detecting in which of the plurality of channels an edge is generated and which kind of edge is generated.

5. The input module of claim 4, wherein, the control unit increases or decreases the coefficient value when a rising or falling edge is generated in any one of the plurality of channels by detecting whether the pulse signal of another channel is high or low.

6. The input module of claim 1, wherein the decision unit is comprising a NAND gate that outputs a high signal when at least one of the plurality of output signals is a low signal.

7. The input module of claim 1, wherein the decision unit is further configured to detect whether at least one of the received plurality of output signals is a low signal.

8. An input method of a programmable logic controller (PLC), the method comprising:

receiving a pulse signal corresponding to a channel, the pulse signal applied from a load having a plurality of channels;
detecting rising and falling edges of the pulse signal; and
transmitting an output signal that is a result of detecting rising and falling edges of the pulse signal;
receiving a plurality of output signals;
detecting edges of each of the plurality of channels; and
transmitting a detection signal that is a result of detecting edges of each of the plurality of channels; and
identifying the occurrence of an interrupt using the transmitted detection signal and performing a counting process using the pulse signal when the interrupt occurs,
wherein transmitting the output signal comprises:
receiving the pulse signal as a clock signal;
outputting a low signal when the rising edge is detected in the pulse signal;
inverting the pulse signal;
receiving the inverted pulse signal as a clock signal; and
outputting a low signal when the rising edge is detected in the pulse signal.

9. The method of claim 8, further comprising:
outputting a low signal when the rising edge is detected in the pulse signal; and
outputting a high signal when the falling edge is detected in the pulse signal.

10. The method of claim 8, further comprising outputting a high signal when at least one of the plurality of output signals is a low signal.

11. The method of claim 8, wherein performing the counting process comprises using the received pulse signal to increase or decrease a coefficient value by detecting in which channel an edge is generated and which kind of edge is generated.

* * * * *